(12) United States Patent
Fargo et al.

(10) Patent No.: US 7,911,175 B2
(45) Date of Patent: Mar. 22, 2011

(54) TWO SPEED INDUCTION MOTOR WITH TAPPED AUXILIARY WINDING

(75) Inventors: Vincent Fargo, St. Charles, MO (US); Dick Cao, Suzhou Industrial Park (CN); Yang Xilai, Suzhou Industrial Park (CN)

(73) Assignee: Emerson Electric Co., St. Louis, MO (US)

( * ) Notice: Subject to any disclaimer, the term of this patent is extended or adjusted under 35 U.S.C. 154(b) by 360 days.

(21) Appl. No.: 12/193,289

(22) Filed: Aug. 18, 2008

(65) Prior Publication Data
US 2010/0039060 A1    Feb. 18, 2010

(51) Int. Cl.
*H02P 1/42* (2006.01)
*H02P 7/48* (2006.01)

(52) U.S. Cl. ........ 318/775; 318/772; 318/774; 318/776; 310/179; 310/180

(58) Field of Classification Search .......... 318/772–779; 310/179, 180
See application file for complete search history.

(56) References Cited

U.S. PATENT DOCUMENTS

| | | | |
|---|---|---|---|
| 4,103,213 A | | 7/1978 | Landgraf |
| 4,322,665 A | * | 3/1982 | Landgraf .................. 318/774 |
| 4,476,422 A | * | 10/1984 | Kirschbaum ............. 318/776 |
| 4,486,699 A | * | 12/1984 | Hoemann et al. .......... 318/772 |
| 4,737,701 A | * | 4/1988 | Hoemann et al. .......... 318/772 |
| 4,937,513 A | * | 6/1990 | Hoemann et al. .......... 318/772 |
| 5,134,332 A | * | 7/1992 | Nakamura et al. .......... 310/208 |
| 6,175,209 B1 | * | 1/2001 | Fei .......................... 318/776 |
| 6,255,755 B1 | * | 7/2001 | Fei .......................... 310/184 |
| 6,271,639 B1 | * | 8/2001 | Fei .......................... 318/524 |
| 6,707,214 B1 | * | 3/2004 | Fei .......................... 310/184 |
| 6,741,061 B2 | * | 5/2004 | Brown ..................... 318/772 |
| 6,788,031 B2 | * | 9/2004 | Pendell ...................... 322/44 |
| 6,815,926 B2 | * | 11/2004 | Fei et al. ................... 318/773 |
| 7,091,691 B2 | * | 8/2006 | Min et al. .................. 318/772 |
| 7,196,490 B2 | * | 3/2007 | Kim et al. .................. 318/751 |
| 7,598,648 B2 | * | 10/2009 | Fei .......................... 310/184 |
| 2004/0041490 A1 | | 3/2004 | Fei |
| 2004/0263110 A1 | * | 12/2004 | Pendell ..................... 318/794 |
| 2005/0237022 A1 | * | 10/2005 | Kim et al. .................. 318/781 |
| 2005/0269979 A1 | * | 12/2005 | Min et al. ................... 318/66 |
| 2006/0181238 A1 | * | 8/2006 | Choi et al. ................. 318/786 |
| 2008/0116759 A1 | * | 5/2008 | Lin .......................... 310/184 |

FOREIGN PATENT DOCUMENTS

| JP | 05-252708 | 9/1993 |
|---|---|---|
| KR | 10-0688183 | 3/2007 |
| KR | 100768046 | 10/2007 |

* cited by examiner

*Primary Examiner* — Paul Ip
(74) *Attorney, Agent, or Firm* — Harness, Dickey & Pierce, P.L.C.

(57) ABSTRACT

A six lead, two speed, consequent wound, single phase induction motor with a tapped auxiliary winding having a 2-pole high speed mode and 4-pole low speed mode. A portion of the auxiliary winding is connected in series with the four pole main winding. The 4-pole low speed mode has an efficiency of over 80%.

20 Claims, 15 Drawing Sheets

FIG. 8A

T1 —— BLACK TR. ——————————————————

AX2

AX2

AX2

AX2

T8 —— BLACK TR.

FIG. 8B

T1 — BLACK TR.

AX2

AX2

AX2

AX2

T8 — BLACK TR.

FIG. 11A

```
T1 ——— BLACK TR.

M2        M1

M1

M2
T2 ——— RED TR.
T7 ——— WHITE
```

TWO SPEED INDUCTION MOTOR WITH TAPPED AUXILIARY WINDING

FIELD OF THE INVENTION

The present invention generally relates to a two speed motor with increased low speed efficiency. In particular, the invention relates to a six lead, two speed, consequent wound, single phase induction motor with a tapped auxiliary winding.

BACKGROUND OF THE INVENTION

Two speed, consequent wound, single phase induction motors are known, such as illustrated in U.S. Pat. Nos. 4,103,213 and 4,322,665. Generally, such motors tend to be more efficient at high speed than at low speed. We increased emphasis on energy savings, the demand for higher efficiency of such motors has increased. In particular, there is a need for increased efficiency of two speed, consequent wound, single phase induction motors when operating at the low speed.

SUMMARY OF THE INVENTION

In one form, the invention comprises a six lead, two speed, consequent wound, single phase induction motor with a tapped auxiliary winding having a 2-pole high speed mode and 4-pole low speed mode. A portion of the auxiliary winding is connected in series with the four pole main winding.

Other objects and features will be in part apparent and in part pointed out hereinafter.

BRIEF DESCRIPTION OF THE DRAWINGS

FIGS. 8A and 8B illustrate the windings energized for 4-pole low speed start-up of the motors of FIGS. 1 and 2, respectively.
FIGS. 11A and 11B illustrate the windings energized for 2-pole high speed running of the motors of FIGS. 1 and 2, respectively.

Corresponding reference characters indicate corresponding parts throughout the drawings.

DESCRIPTION OF THE PREFERRED EMBODIMENTS

The present invention is a six lead, two speed, consequent wound, single phase induction motor with a tapped auxiliary winding. A portion of the auxiliary winding is connected in series with the four pole main winding to increase the overall magnet wire content for the 4-pole low speed run winding without increasing the slot fill or changing the lamination configuration.

Figure 1:
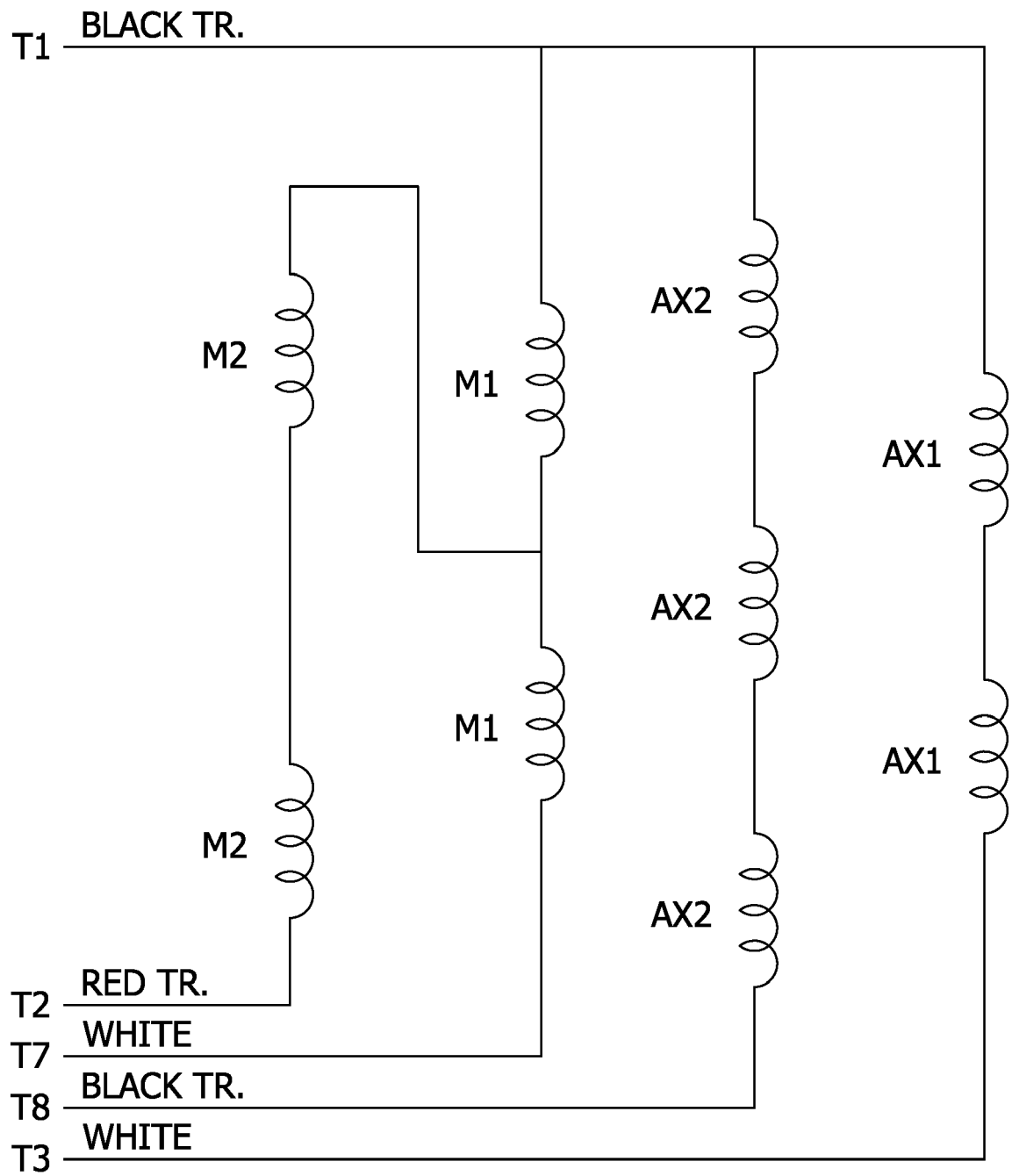
FIG. 1 is a schematic winding diagram of a prior art motor.

FIG. 1 is a schematic winding diagram of a five lead, two speed, consequent wound, single phase induction prior art motor without a tapped auxiliary winding. As shown in FIG. 1 and Table 1 below, the motor of the prior art includes a main winding, a 2-pole start (auxiliary) winding and a 4-pole start (auxiliary) winding.

TABLE 1

| PROIR ART MOTOR: | | | |
|---|---|---|---|
| POLE | RUN | START | COMMON |
| 2 (HIGH SPEED) | T2 (M1, M2) | T3 (M1, AX1) | T1, T7 |
| 4 (LOW SPEED) | T7 (M1) | T8 (AX2) | T1 |

Figure 8A:
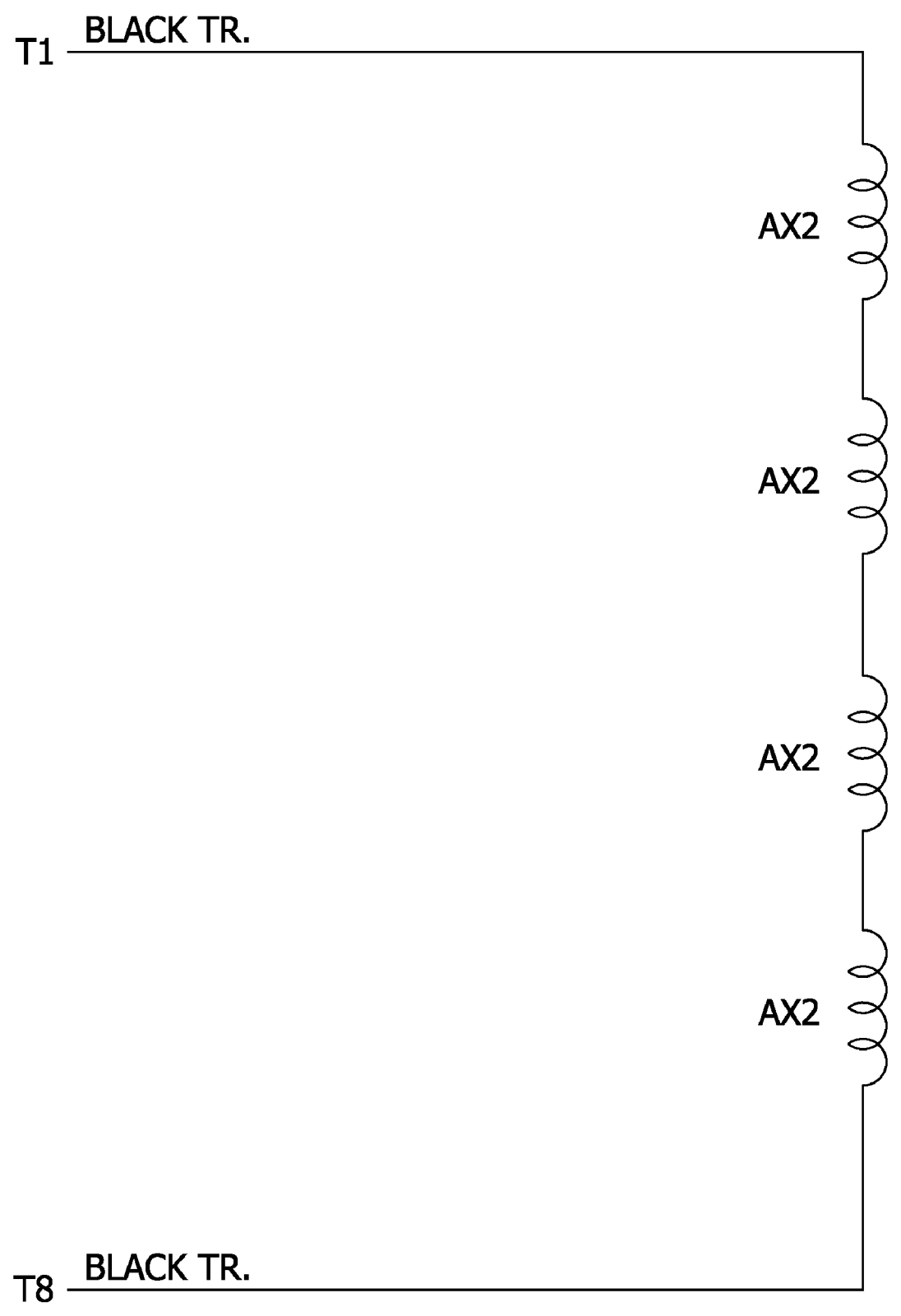

As shown in FIG. 8A, during 4-pole low speed starting, a 4-pole start winding AX2 is energized via a switch (see FIG. 5) which connects T1 to a common line of a power supply and which connects T8 to a main line of the power supply.

Figure 10A:
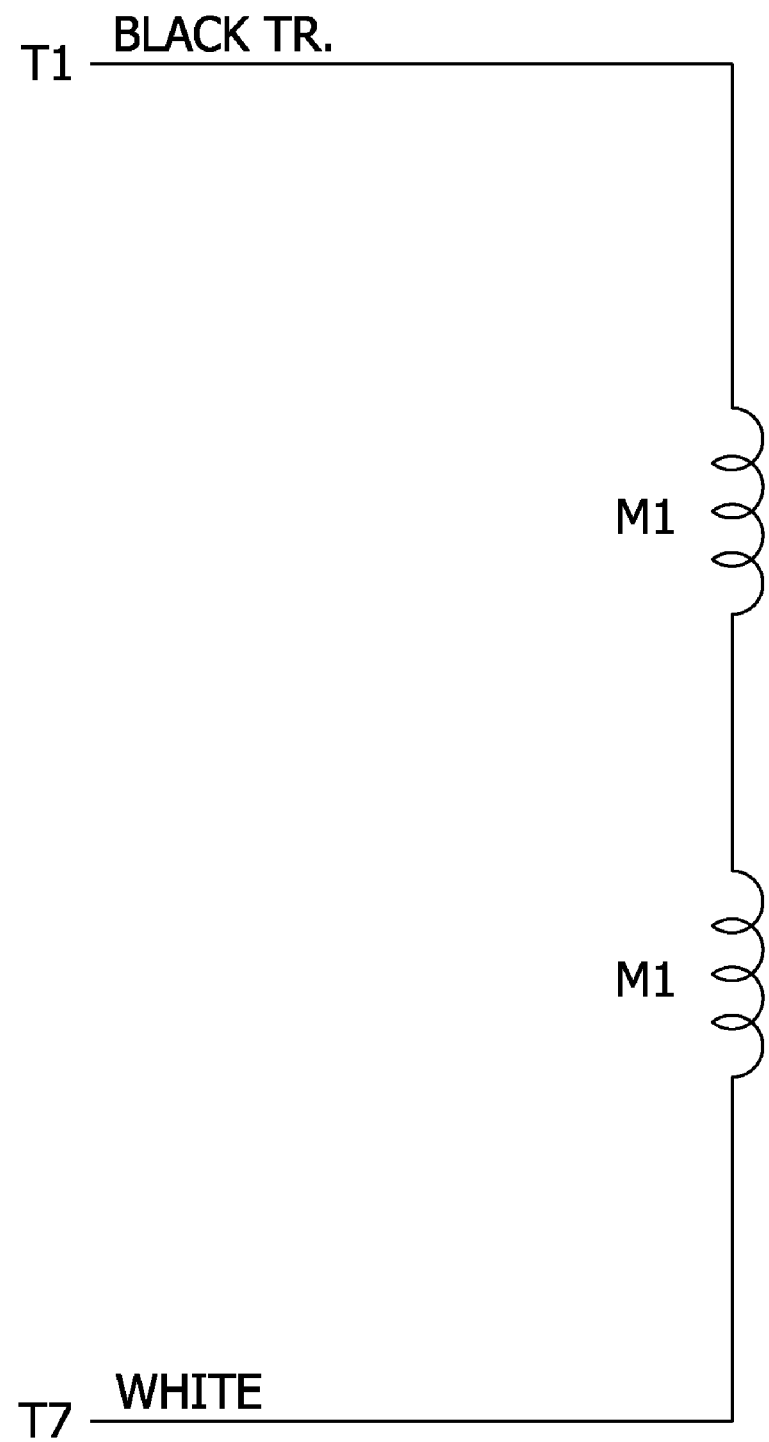
FIGS. 10A and 10B illustrate the windings energized for 4-pole low speed running of the motors of FIGS. 1 and 2, respectively.

As shown in FIG. 10A, during 4-pole low speed running, a first portion M1 of the main winding is energized via a switch (see FIG. 5) which connects T1 to a common line of the power supply and which connects T7 to the main line of the power supply.

Figure 9A:
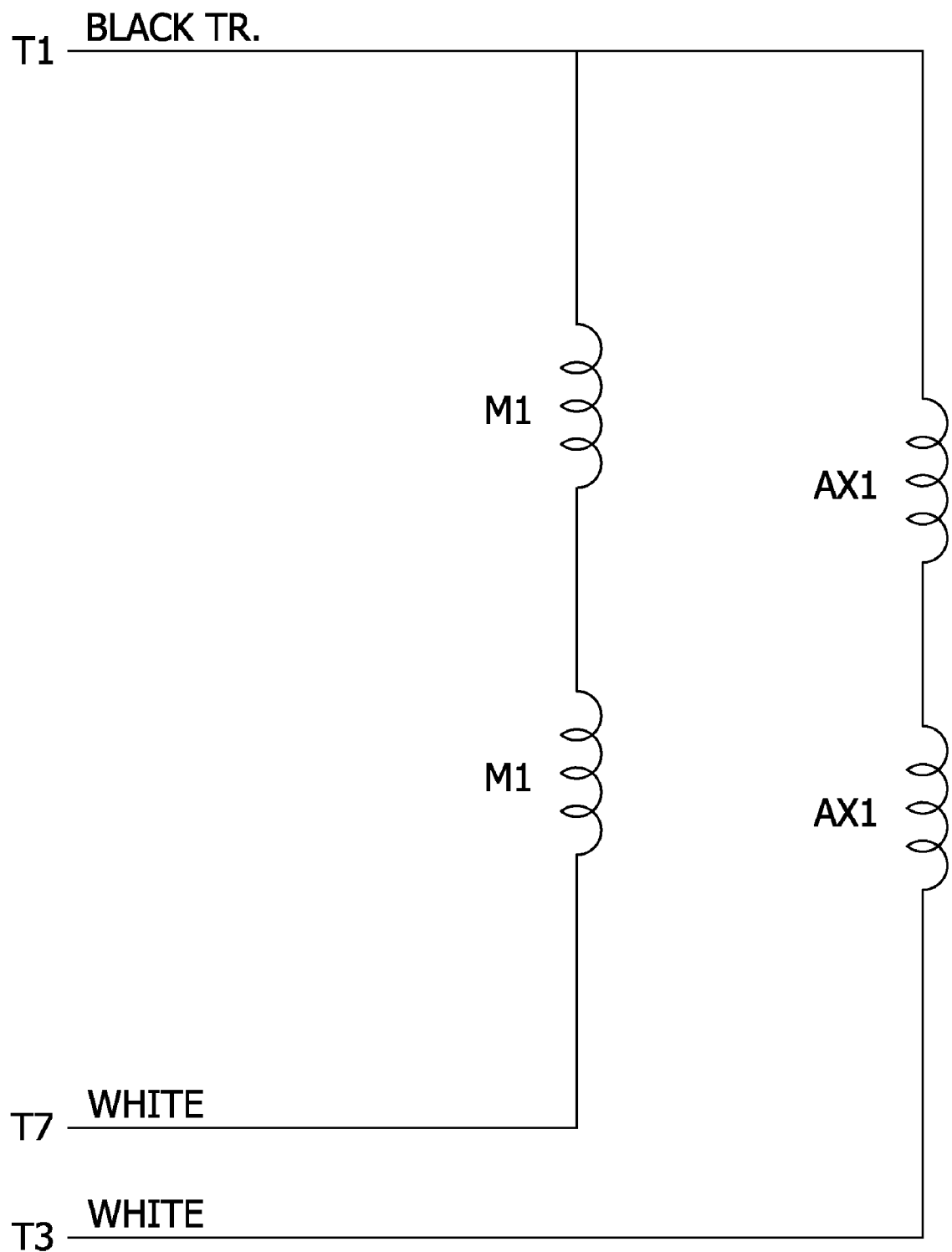
FIGS. 9A and 9B illustrate the windings energized for 2-pole high speed start-up of the motors of FIGS. 1 and 2, respectively.

As shown in FIG. 9A, during 2-pole high speed starting, the first portion M1 and a 2-pole start winding AX1 are energized via a switch (see FIG. 5) which connects T1 and T7 to a common line of a power supply and which connects T3 to a main line of the power supply.

Figure 11A:
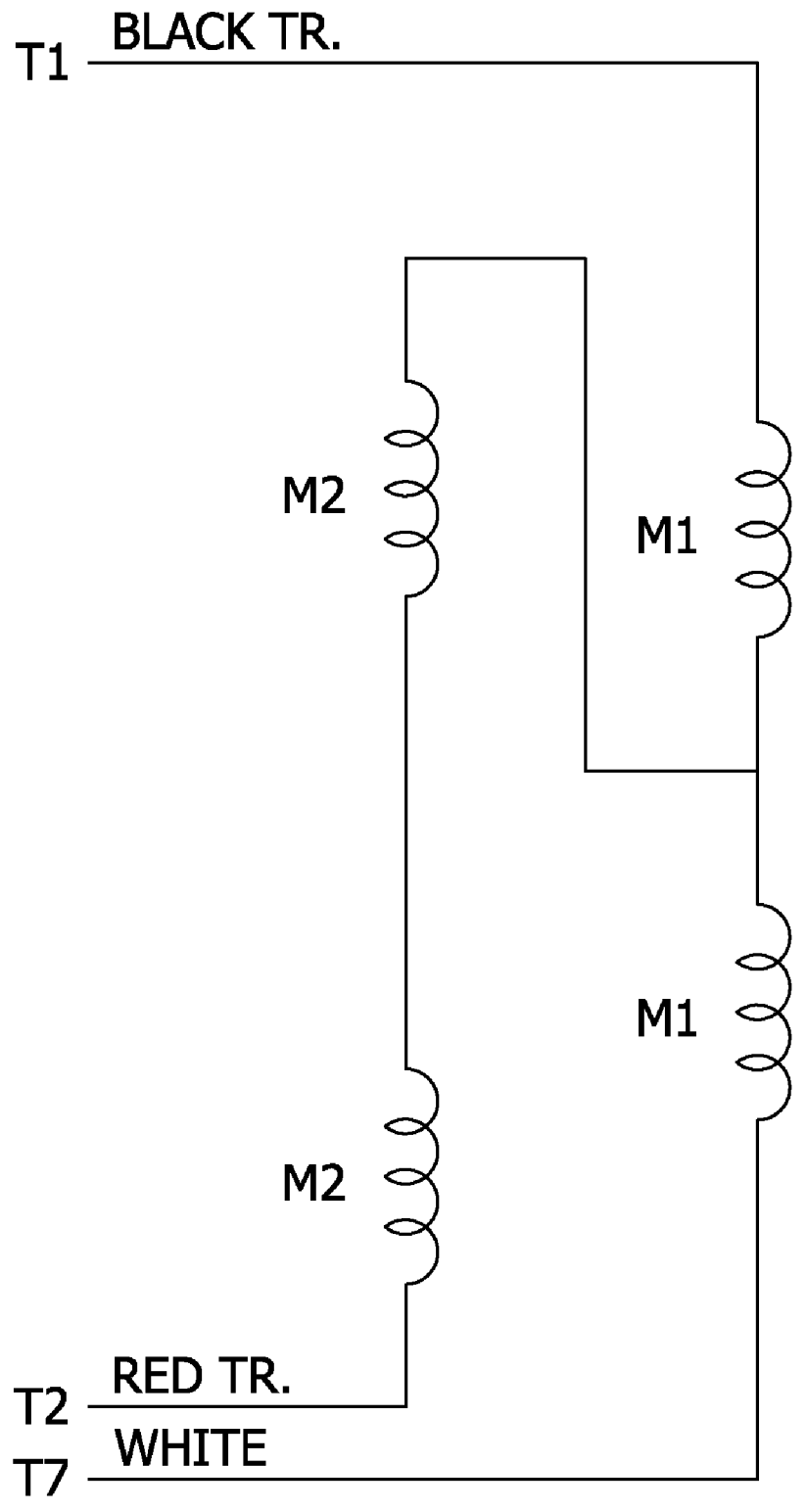

As shown in FIG. 11A, during 2-pole high speed running, first and second portions M1, M2 of the main winding are energized via a switch (see FIG. 5) which connects T1 and T7 to a common line of a power supply and which connects T2 to a main line of the power supply.

Figure 2:
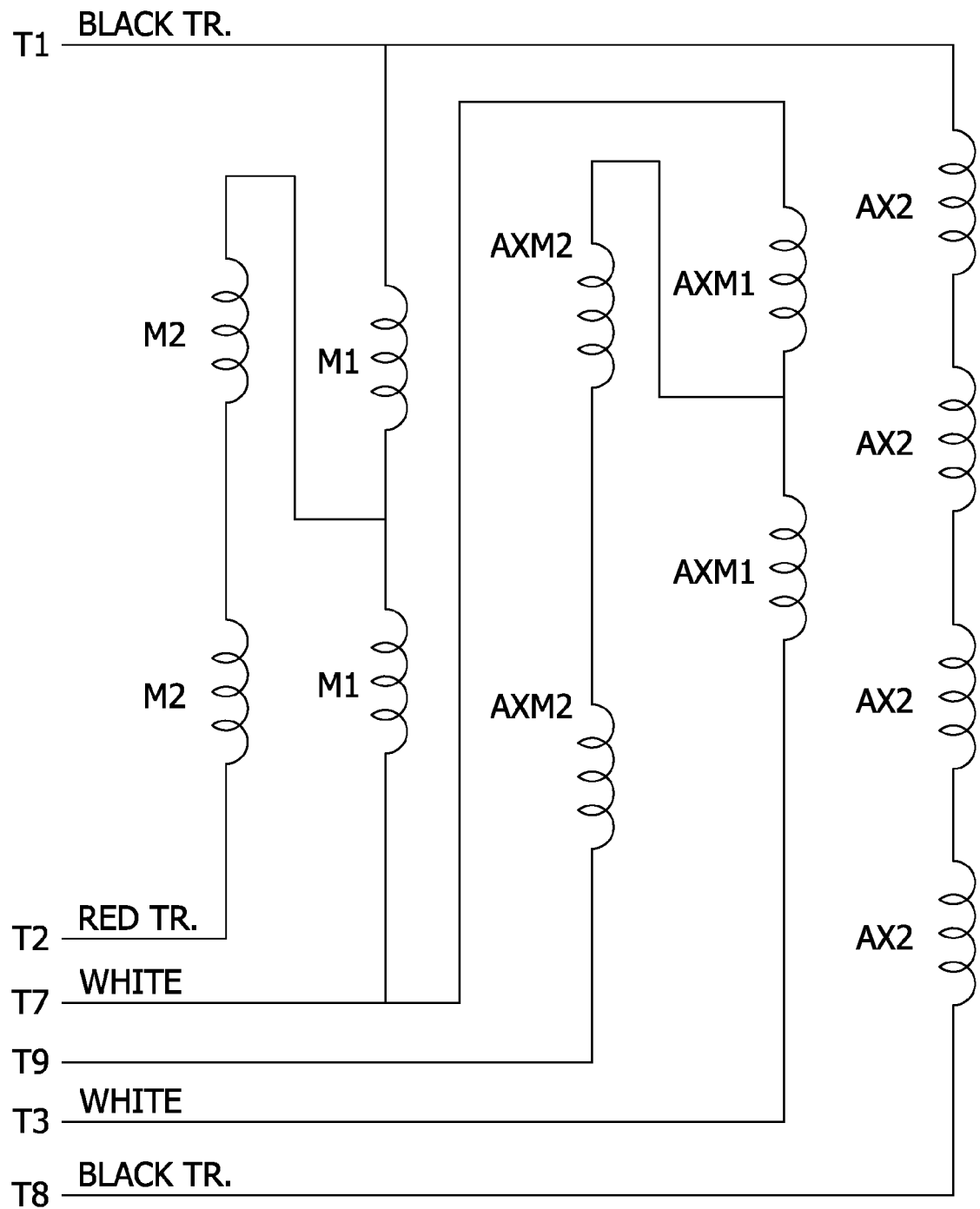
FIG. 2 is a schematic winding diagram of one embodiment of a motor of the invention.

FIG. 2 is a schematic winding diagram of one embodiment of a motor of the invention. As shown in FIG. 2 and Table 2 below, the motor of the invention includes a main winding, a tapped 2-pole start (auxiliary) winding and a 4-pole start (auxiliary) winding.

TABLE 2

| ONE EMBODIMENT OF THE MOTOR OF THE INVENTION: | | | |
|---|---|---|---|
| POLE | RUN | START | COMMON |
| 2 (HIGH SPEED) | T2 (M2, M2, AXM1) | T9 (M1, AXM1, AXM2) | T1, T3, T7 |
| 4 (LOW SPEED) | T3 (M1, AXM1) | T8 (AX2) | T1 |

Figure 8B:
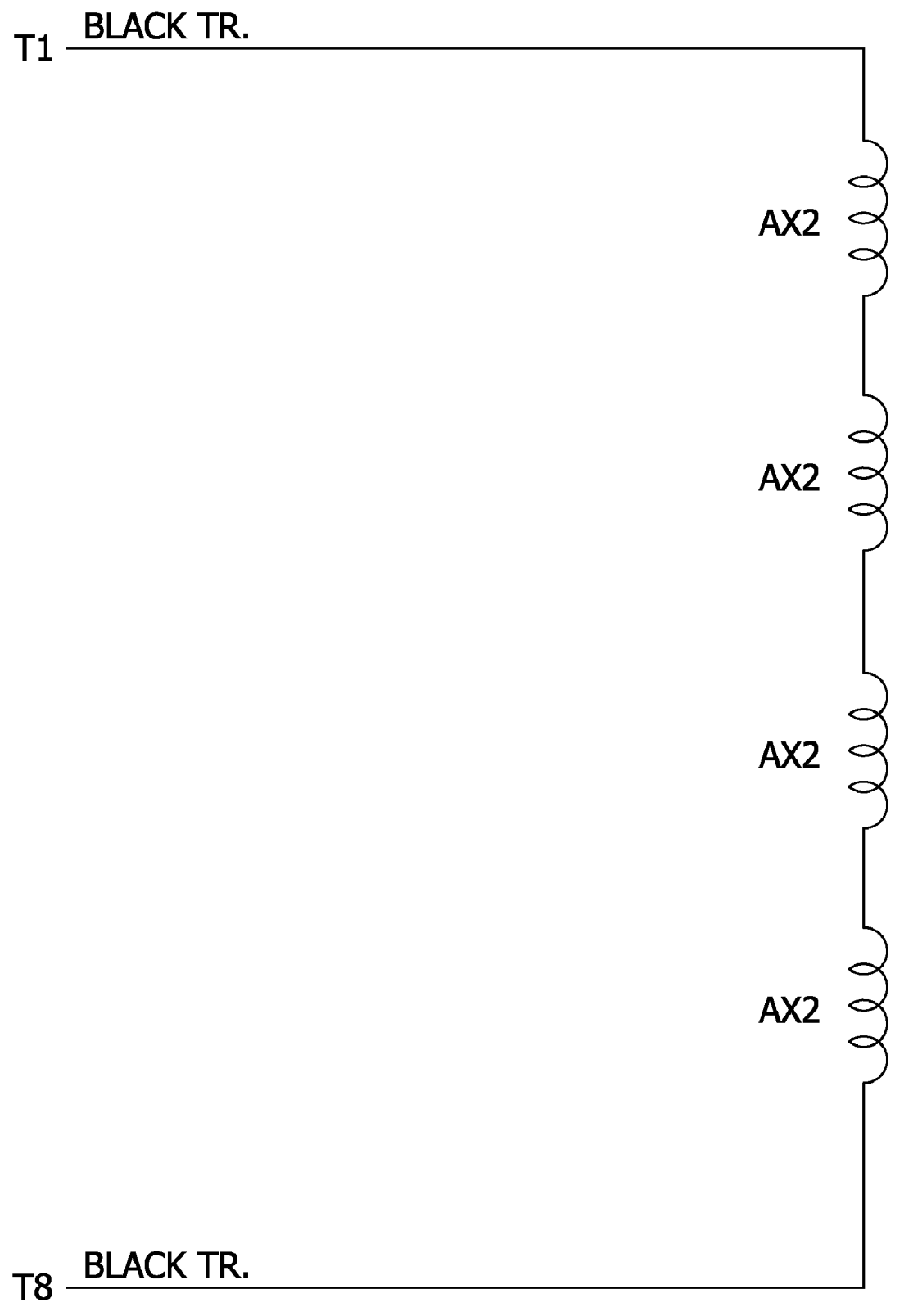

As shown in FIG. 8B, during 4-pole low speed starting, the 4-pole start winding AX2 is energized via a switch (see FIG. 6) which connects T1 to a common line of a power supply and which connects T8 to the main line of the power supply.

Figure 10B:
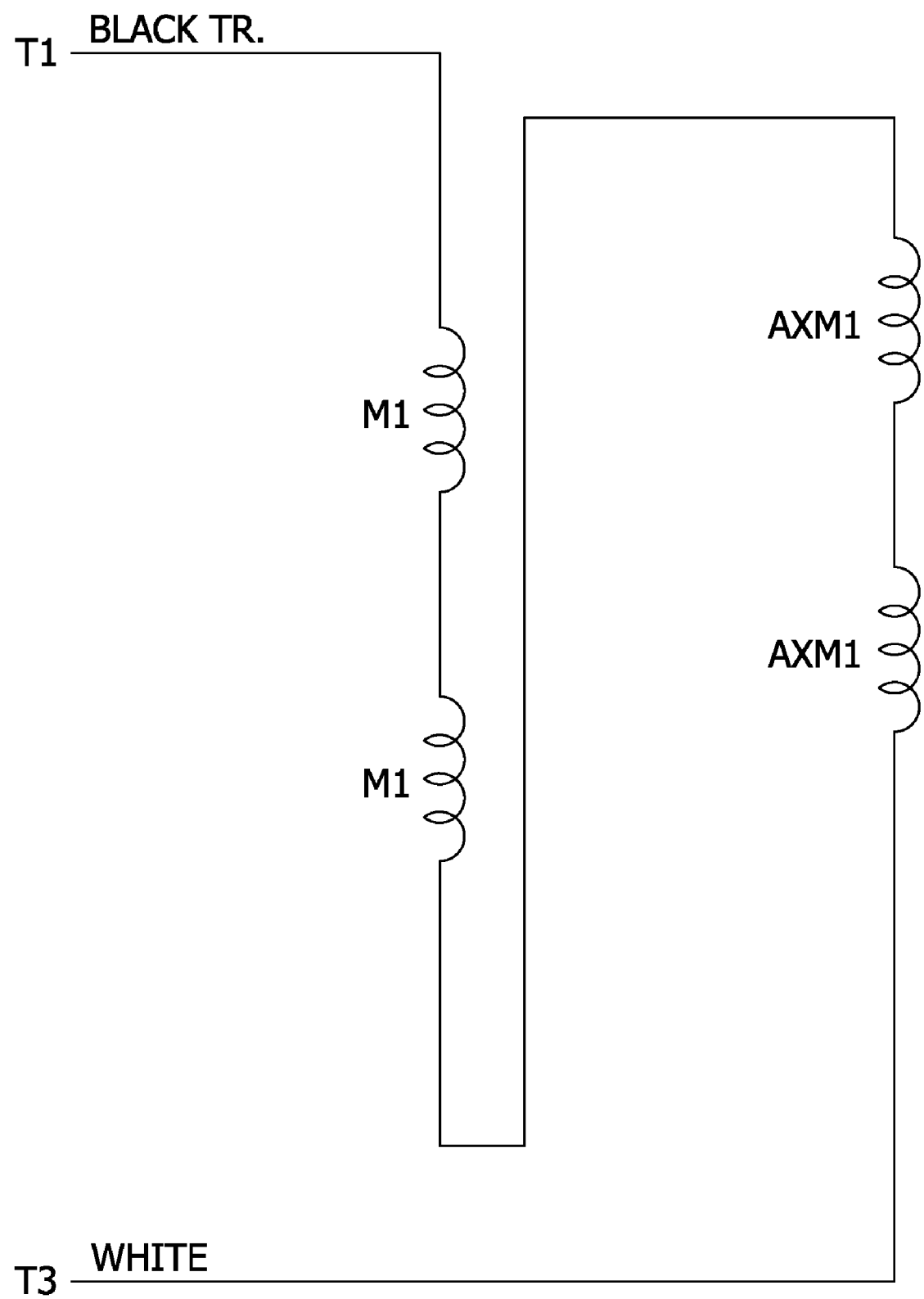

As shown in FIG. 10B, during 4-pole low speed running, a first portion M1 of the main winding and a first portion AXM1 of the tapped 2-pole start winding are energized via a switch (see FIG. 6) which connects T1 to a common line of the power supply and which connects T3 to the main line of the power supply.

Figure 9B:
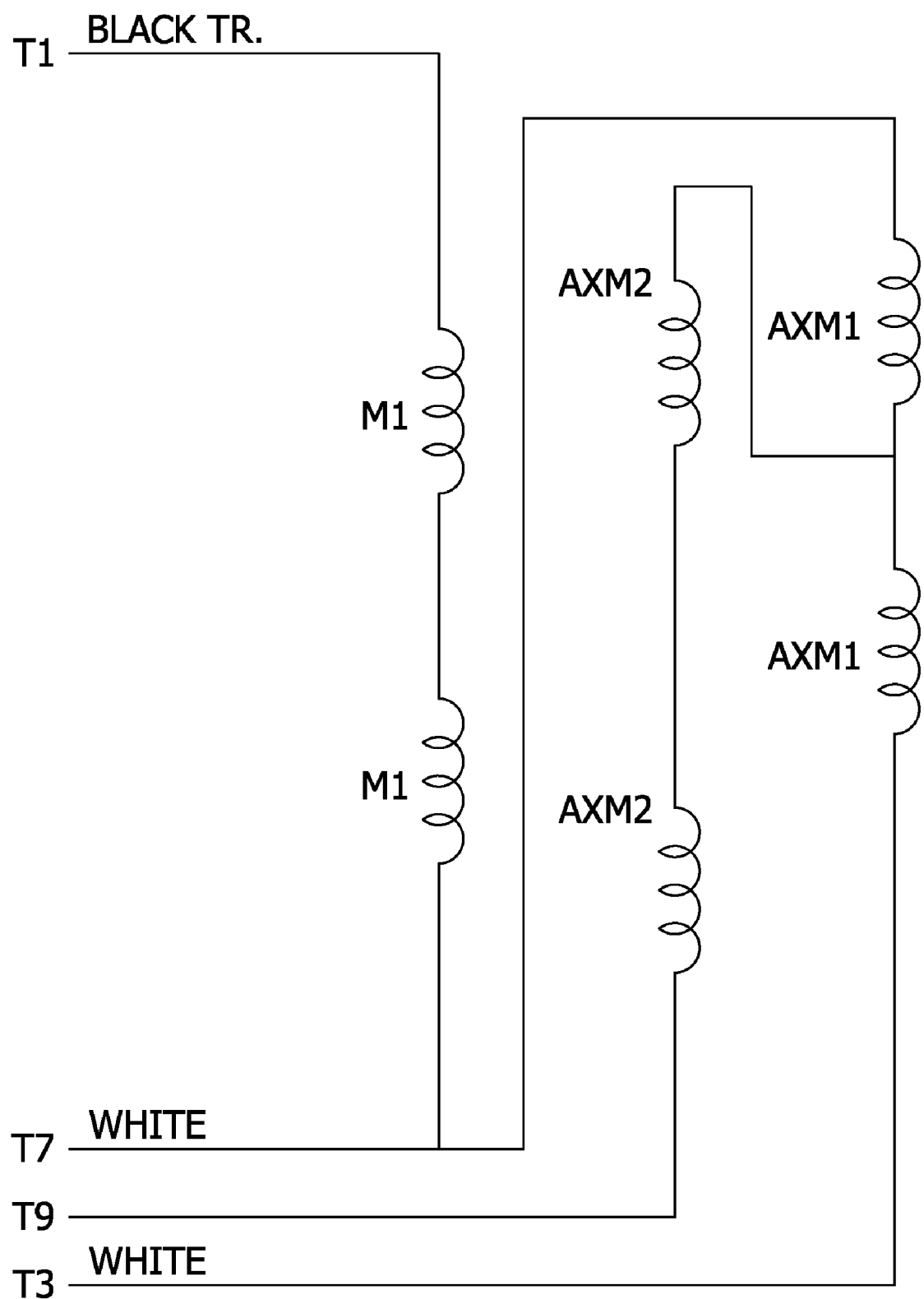

As shown in FIG. 9B, during 2-pole high speed starting, the first portion M1 and first and second portions AXM1, AXM2 of the tapped 2-pole start winding are energized via a switch (see FIG. 6) which connects T1, T3 and T7 to a common line of a power supply and which connects T2 to a main line of the power supply.

Figure 11B:
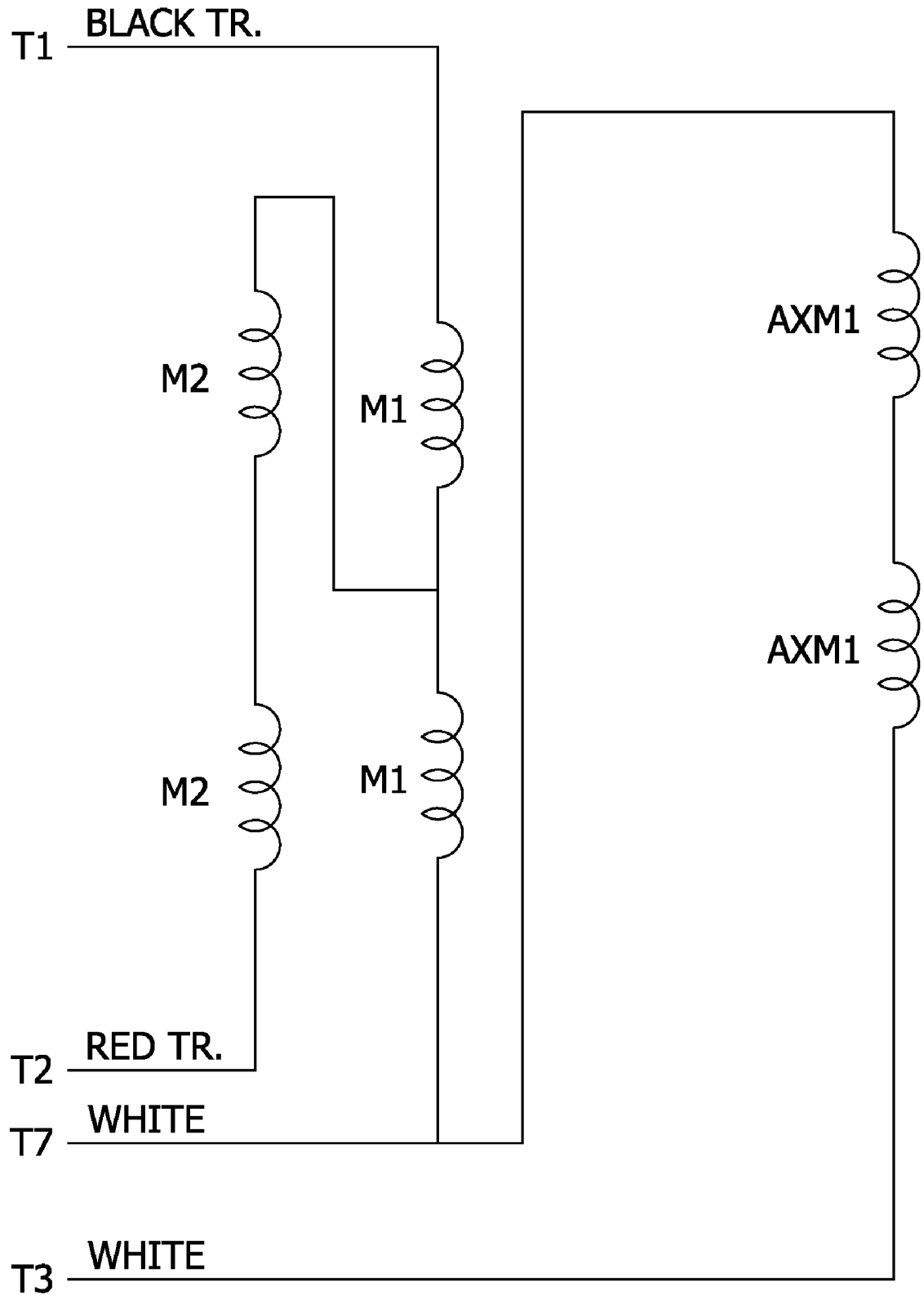

As shown in FIG. 11B, during 2-pole high speed running, first and second portions M1, M2 of the main winding and the first portion AXM1 of the tapped 2-pole start winding are energized via a switch (see FIG. 6) which connects T1, 73 and T7 to a common line of a power supply and which connects T2 to a main line of the power supply.

As shown in Table 2, the common line of the 2-pole mode includes lines T1, T3 and T7. The switch connects a common line of the power supply to a first portion (T1/M1) of the main winding, to the first portion (T3/AMX1) of the 2-pole auxiliary winding, and to both the first portion (T7/M1) of the main winding and the first portion (T7/AXM1) of the 2-pole auxiliary winding.

Thus, as illustrated in FIGS. 2, 7, 8B, 9B, 10B and 11B, one embodiment of the invention comprises two speeds, single phase induction motor having a 2-pole high speed mode and 4-pole low speed mode. The motor includes a rotor assembly 702 (see FIG. 7), a core comprising a stack of laminations 704 (see FIG. 7) forming slots and forming a central bore for receiving the rotor assembly 702, a main winding (M1, M2) positioned within the slots of the core and an auxiliary winding. In particular, the auxiliary winding includes a tapped 2-pole auxiliary winding having a first portion (AXM1) and a second portion (AXM2) and a 4-pole auxiliary winding (AX2). A switch (see FIG. 6) is adapted to be connected to a power supply. The switch connects to the windings for selectively energizing the windings. The switch is configured to energize at least a portion of the auxiliary winding (AXM1, AXM2, AX2) during start-up of the high speed mode (FIG. 9B) and during start-up of low speed mode (FIG. 8B). In addition, the switch is configured to energize at least a portion of the main winding (M1, M2) during running in the high-speed mode (FIG. 11B) and during running in the low speed mode (FIG. 10B). In addition, the switch is configured to energize the first portion (AMX1) of the tapped 2-pole auxiliary winding during running in the low speed mode (FIG. 10B) thereby increasing the overall content of magnet wire energized during running in the low speed.

As shown in FIGS. 2 and 11B, the switch is configured to energize the first portion (AMX1) of the 2-pole auxiliary winding during running in the high speed mode.

As shown in FIGS. 2 and 9B, the switch is configured to energize the second portion (AMX2) of the 2-pole auxiliary winding during starting in the high speed mode.

As shown in FIGS. 2, 8B, 9B, 10B and 11B, the main and auxiliary windings comprise a consequent (i.e., concentric) winding having 6 leads (T1, T2, T3, T7, T8, T9).

In accordance with one aspect of one embodiment of the invention, both the 2-pole high speed running mode has an efficiency of over 81% and the 4-pole low speed running mode has an efficiency of over 81%. This efficiency is in contrast to the prior art motor, such as shown in U.S. Pat. Nos. 4,103,213 and 4,322,665, which have an efficiency of under 81% in the 4-pole low speed running mode, as illustrated in Table 3.

TABLE 3

Efficiency

| MOTOR | POLE | EFFICIENCY | CONTACT NUMBER | POWER LINE |
|---|---|---|---|---|
| PROIR ART MOTOR | 2 | 85.6 | 5 | 5 |
|  | 4 | 80.4 | 4 |  |
| ONE EMBODIMENT OF INVENTION | 2 | 85.5 | 5 | 6 |
|  | 4 | 82.7 | 4 |  |

Figure 3:
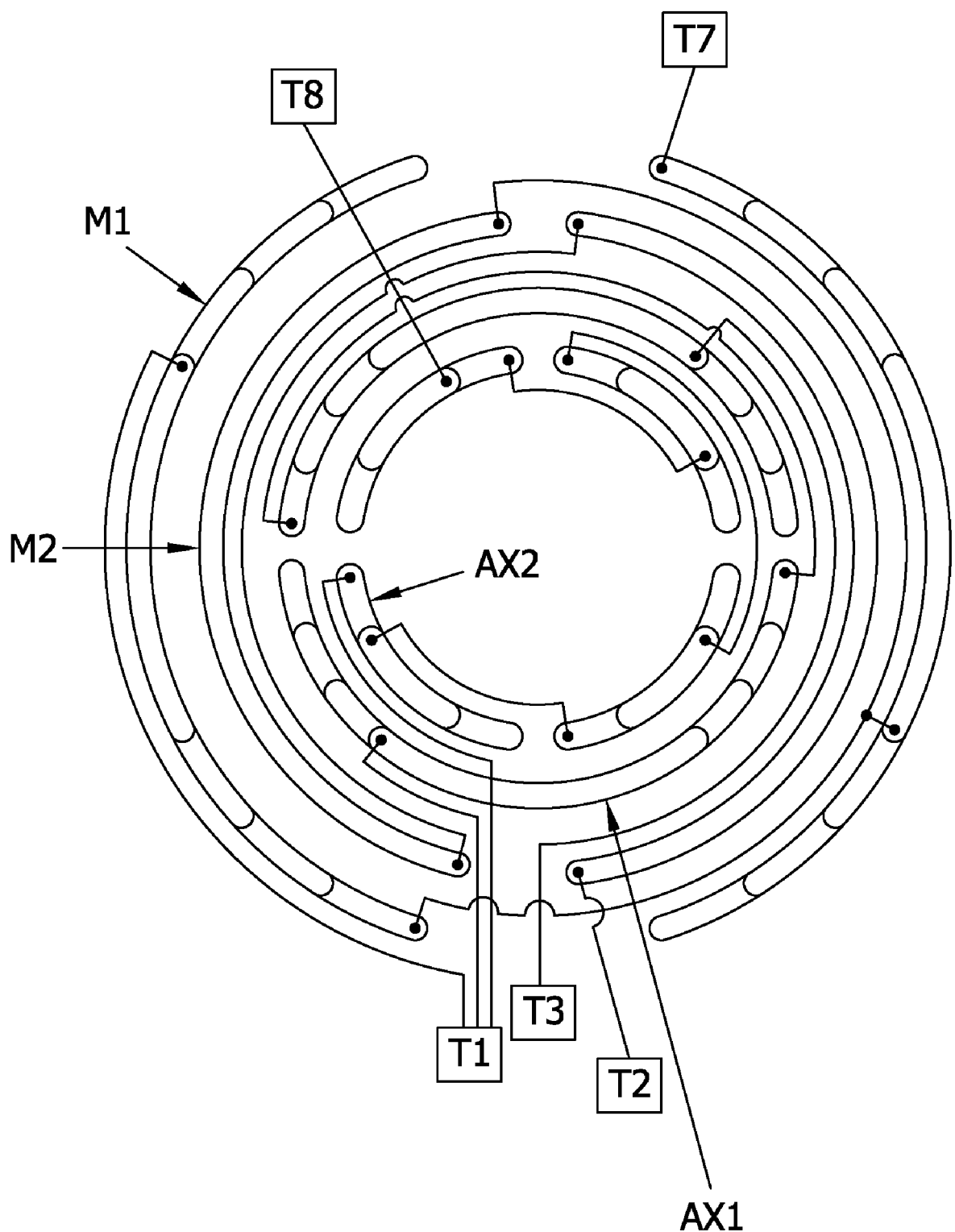
FIG. 3 is a winding connection diagram of the prior art motor of FIG. 1.
Figure 4:
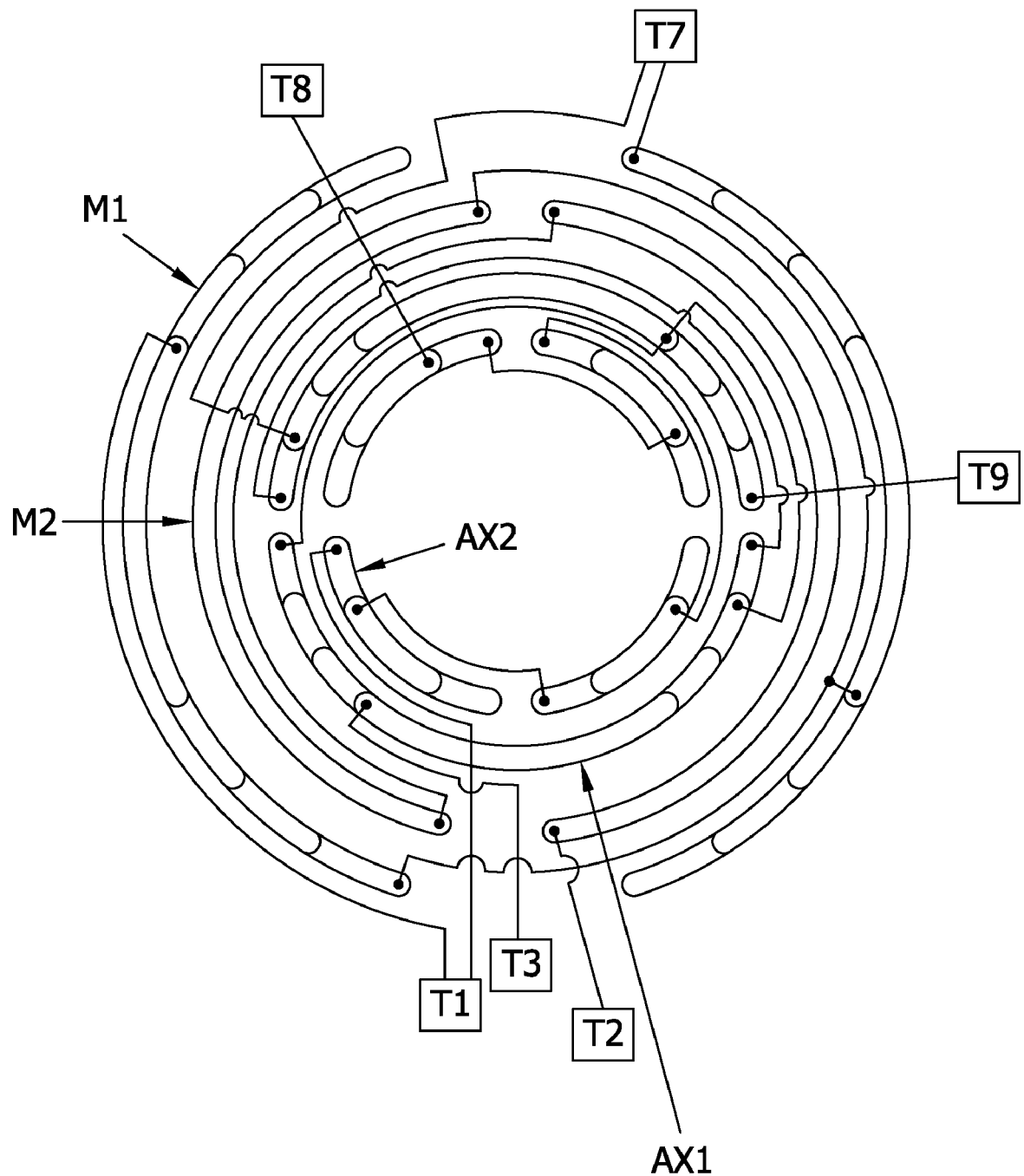
FIG. 4 is a winding connection diagram of the motor of FIG. 2 of the invention.

FIG. 3 is a winding connection diagram of the prior art motor of FIG. 1. In contrast, FIG. 4 is a winding connection diagram of the motor of FIG. 2 of the invention, illustrating the tapped 2-pole start winding requiring an extra 6th lead (T9). This additional connection allows a portion of the 2-pole start winding (AX1) to be connected in series with the main winding (M1).

Figure 5:
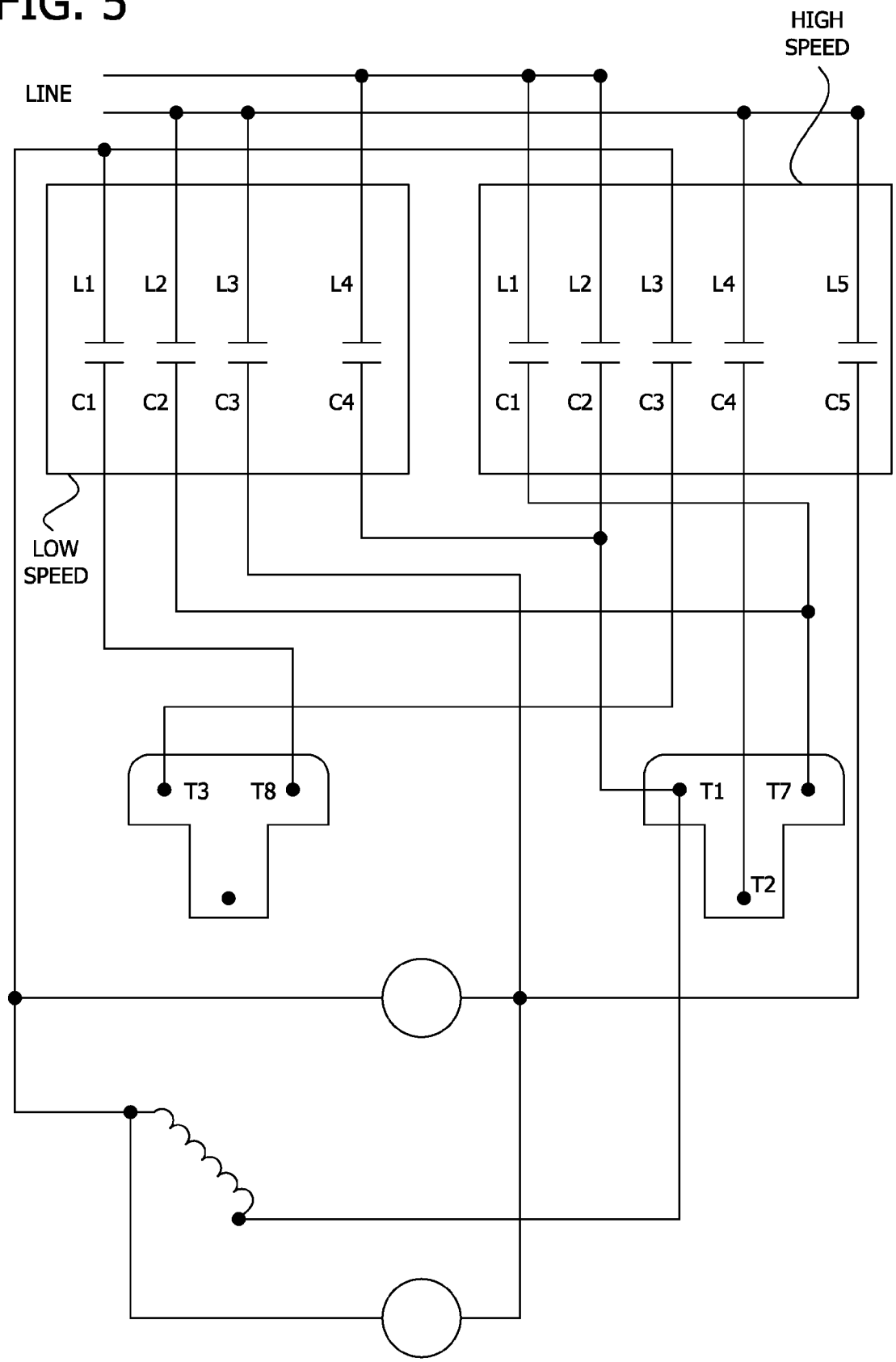
FIG. 5 is a diagram of a prior art switch for selectively energizing the windings of the motor of FIG. 1.
Figure 6:
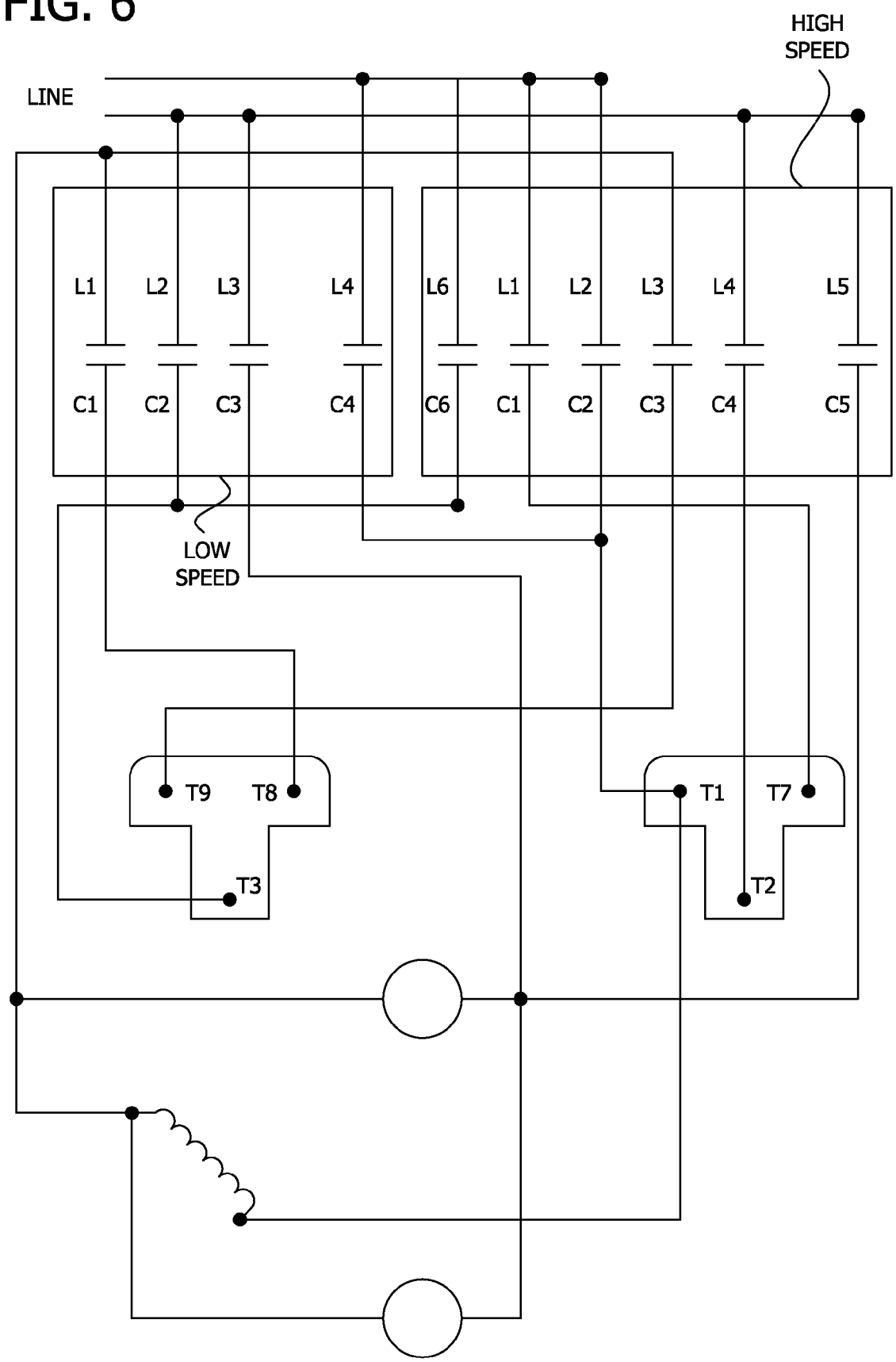
FIG. 6 is a diagram of a switch according to the invention for selectively energizing the windings of the motor of FIG. 2.

FIG. 5 is a diagram of a prior art switch for selectively energizing the windings of the motor of FIG. 1. FIG. 6 is a diagram of a switch according to the invention for selectively energizing the windings of the motor of FIG. 2. The switch of FIG. 6 of the invention for connecting the winding to the power supply is substantially the same as a switch of FIG. 5 of the prior art in a corresponding motor two speed, single phase induction motor having a 2-pole high speed mode and 4-pole low speed mode with 5 leads and having a 2-pole winding without a tap. However, FIG. 6 utilizes an extra set of contactors L6, C6 and lead T9 to reconfigure the 2-pole high speed start winding.

Figure 7:
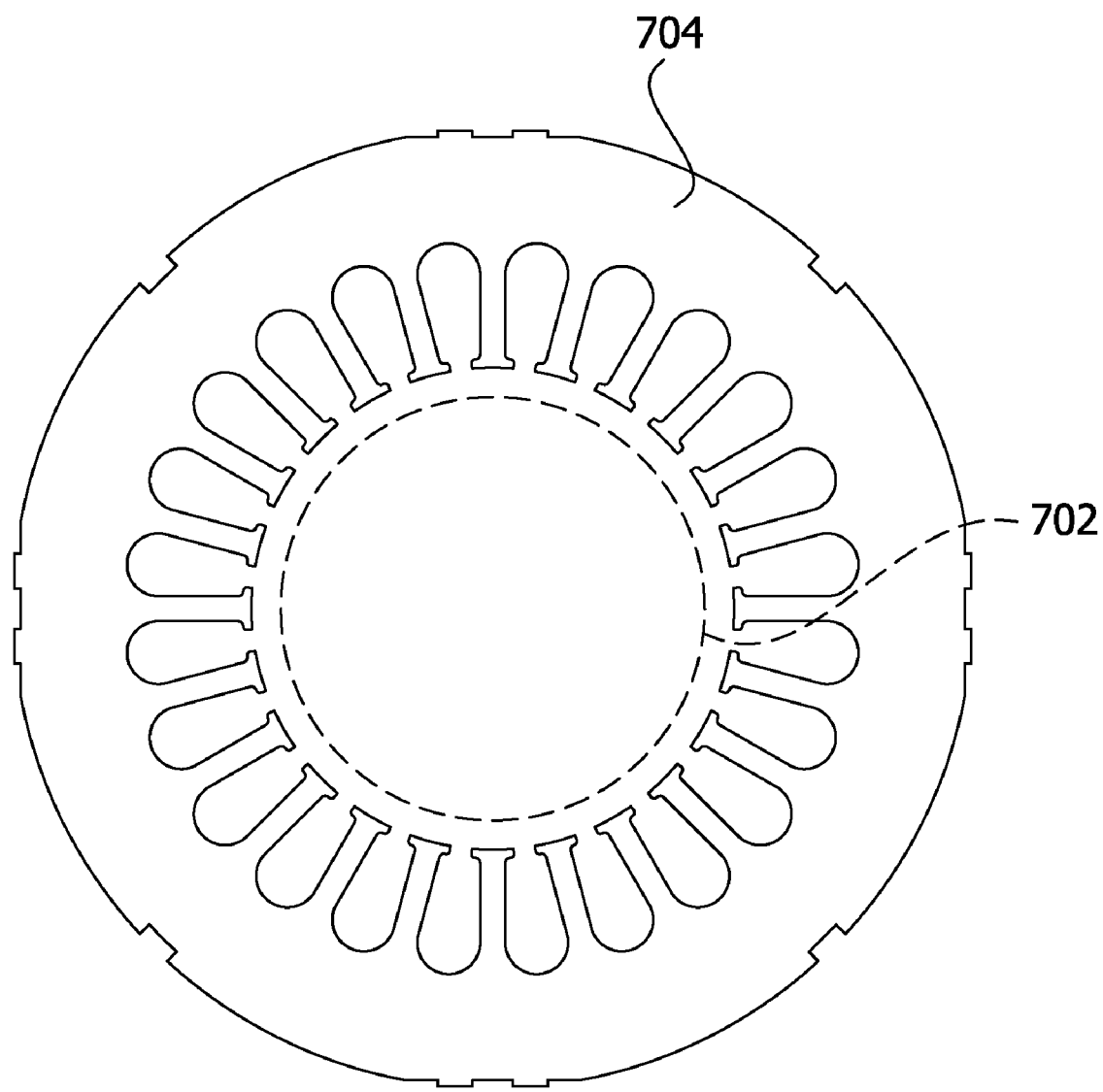
FIG. 7 is a lamination for the motor of the invention corresponding to prior art FIG. 2 of U.S. Pat. No. 4,322,665.

FIG. 7 is the lamination 704 for the motor of the invention corresponding to prior art FIG. 2 of U.S. Pat. No. 4,322,665. The slots of a core of a stack of such laminations are substantially the same size as slots in a corresponding motor two speed, single phase induction motor having a 2-pole high speed mode and 4-pole low speed mode with 5 leads and having a 2-pole winding without a tap. As a result, the overall content of magnet wire energized during running in the low speed is increased without increasing magnet wire content within the slots.

Having described the invention in detail, it will be apparent that modifications and variations are possible without departing from the scope of the invention defined in the appended claims.

Thus, as shown in the Motor Performance table below, the efficiency of the motor according to the invention during the 4-pole low speed running* at 50 Hz increases from 80.4% to 82.7% while the efficiency of the motor during 2-pole high speed running at 50 Hz is maintained similarly changes only slightly from 85.6% to 85.5%.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Having described aspects of the invention in detail, it will be apparent that modifications and variations are possible without departing from the scope of aspects of the invention as defined in the appended claims.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A two speed, single phase induction motor having a 2-pole high speed mode and 4-pole low speed mode, said motor comprising:
   a rotor assembly;
   a core comprising a stack of laminations forming slots and forming a central bore for receiving the rotor assembly;
   a main winding positioned within the slots of the core;
   an auxiliary winding comprising:
      a tapped 2-pole auxiliary winding having a first portion and a second portion;
      a 4-pole auxiliary winding; and
   a switch adapted to be connected to a power supply, said switch connected to the windings for selectively energizing the windings,
   said switch configured to energize at least a portion of the auxiliary winding during start-up of the high speed mode and during start-up of low speed mode,
   said switch configured to energize at least a portion of the main winding during running in the high-speed mode and during running in the low speed mode, and
   said switch configured to energize the first portion of the tapped 2-pole auxiliary winding during running in the low speed mode thereby increasing the overall content of magnet wire energized during running in the low speed.

2. The motor of claim 1 wherein said switch is configured to energize the first portion of the 2-pole auxiliary winding during running in the high speed mode.

3. The motor of claim 1 wherein said switch is configured to energize the second portion of the 2-pole auxiliary winding during starting in the high speed mode.

4. The motor of claim 1 wherein said switch connects a common line of the power supply to a first portion of the main winding, to the first portion of the 2-pole auxiliary winding, and to both the first portion of the main winding and the first portion of the 2-pole auxiliary winding.

5. The motor of claim 1 wherein the main and auxiliary windings comprise a consequent winding having 6 leads.

6. The motor of claim 5 wherein the slots of the core are substantially the same size as slots in a corresponding motor two speed, single phase induction motor having a 2-pole high speed mode and 4-pole low speed mode with 5 leads and having a 2-pole winding without a tap thereby increasing the overall content of magnet wire energized during running in the low speed without increasing magnet wire content within the slots.

7. The motor of claim 6 wherein said switch is configured to energize the first portion of the 2-pole auxiliary winding during running in the high speed mode, and wherein said switch is configured to energize the second portion of the 2-pole auxiliary winding during running in the high speed mode.

8. The motor of claim 7 wherein the 2-pole high speed mode has an efficiency of over 81% and the 4-pole low speed mode has an efficiency of over 81%.

9. The motor of claim 8 wherein said switch connects a common line of the power supply to a first portion of the main winding, to the first portion of the 2-pole auxiliary winding, and to both the first portion of the main winding and the first portion of the 2-pole auxiliary winding.

10. The motor of claim 9 wherein the switch is substantially the same as a switch in a corresponding motor two speed, single phase induction motor having a 2-pole high speed mode and 4-pole low speed mode with 5 leads and having a 2-pole winding without a tap.

11. The motor of claim 5 wherein the switch is substantially the same as a switch in a corresponding motor two speed, single phase induction motor having a 2-pole high speed mode and 4-pole low speed mode with 5 leads and having a 2-pole winding without a tap.

12. In a two speed, single phase induction motor having a 2-pole high speed mode and 4-pole low speed mode, wherein the motor comprises a rotor assembly, a core comprising a stack of laminations forming slots and forming a central bore for receiving the rotor assembly, and a main winding positioned within the slots of the core; the improvement comprising:
   an auxiliary winding having:
      a tapped 2-pole auxiliary winding having a first portion and a second portion;
      a 4-pole auxiliary winding; and
   a switch adapted to be connected to a power supply, said switch connected to the windings for selectively energizing the windings,
   said switch configured to energize at least a portion of the auxiliary winding during start-up of the high speed mode and during start-up of low speed mode,
   said switch configured to energize at least a portion of the main winding during running in the high-speed mode and during running in the low speed mode, and
   said switch configured to energize the first portion of the tapped 2-pole auxiliary winding during running in the low speed mode thereby increasing the overall content of magnet wire energized during running in the low speed.

13. The motor of claim 12 wherein said switch is configured to energize the first portion of the 2-pole auxiliary winding during running in the high speed mode.

14. The motor of claim 13 wherein said switch is configured to energize the second portion of the 2-pole auxiliary winding during starting in the high speed mode.

15. The motor of claim 14 wherein said switch connects a common line of the power supply to a first portion of the main winding, to the first portion of the 2-pole auxiliary winding, and to both the first portion of the main winding and the first portion of the 2-pole auxiliary winding.

16. The motor of claim 15 wherein the slots of the core are substantially the same size as slots in a corresponding motor two speed, single phase induction motor having a 2-pole high speed mode and 4-pole low speed mode with 5 leads and having a 2-pole winding without a tap thereby increasing the overall content of magnet wire energized during running in the low speed without increasing magnet wire content within the slots.

17. The motor of claim 16 wherein said switch is configured to energize the first portion of the 2-pole auxiliary winding during running in the high speed mode, and wherein said switch is configured to energize the second portion of the 2-pole auxiliary winding during running in the high speed mode.

18. The motor of claim 17 wherein the 2-pole high speed mode has an efficiency of over 81% and the 4-pole low speed mode has an efficiency of over 81%.

19. The motor of claim 18 wherein said switch connects a common line of the power supply to a first portion of the main winding, to the first portion of the 2-pole auxiliary winding, and to both the first portion of the main winding and the first portion of the 2-pole auxiliary winding.

20. The motor of claim 19 wherein the switch is substantially the same as a switch in a corresponding motor two speed, single phase induction motor having a 2-pole high speed mode and 4-pole low speed mode with 5 leads and having a 2-pole winding without a tap and wherein the main and auxiliary windings comprise a consequent winding having 6 leads.

* * * * *

UNITED STATES PATENT AND TRADEMARK OFFICE
CERTIFICATE OF CORRECTION

| | | |
|---|---|---|
| PATENT NO. | : 7,911,175 B2 | Page 1 of 1 |
| APPLICATION NO. | : 12/193289 | |
| DATED | : March 22, 2011 | |
| INVENTOR(S) | : Fargo et al. | |

It is certified that error appears in the above-identified patent and that said Letters Patent is hereby corrected as shown below:

At column 1, line 16: replace "We" with --With--.

Signed and Sealed this
Twenty-eighth Day of June, 2011

David J. Kappos
*Director of the United States Patent and Trademark Office*